United States Patent
Kässer et al.

[11] Patent Number: 5,673,324
[45] Date of Patent: Sep. 30, 1997

[54] RADIO RECEIVER CIRCUIT FOR DERIVING AT LEAST ONE RECEPTION QUALITY SIGNAL

[75] Inventors: Jürgen Kässer, Diekholzen; Matthias Herrmann, Hildesheim, both of Germany

[73] Assignee: Blaupunkt-Werke GmbH, Hildesheim, Germany

[21] Appl. No.: 215,186

[22] Filed: Mar. 21, 1994

[30] Foreign Application Priority Data

Mar. 24, 1993 [DE] Germany .............. 43 09 518.6

[51] Int. Cl.$^6$ ........................................ H04H 5/00
[52] U.S. Cl. .............. 381/4; 381/13; 455/161.3; 455/226.2; 455/296
[58] Field of Search ............. 381/4, 1, 7, 13; 455/161.1, 161.2, 161.3, 162.1, 226.2, 226.3, 296, 297, 303, 309, 312, 45; 331/20, 25

[56] References Cited

U.S. PATENT DOCUMENTS

| | | | |
|---|---|---|---|
| 4,890,332 | 12/1989 | Takahashi | 455/226.2 |
| 5,125,105 | 6/1992 | Kennedy et al. | 455/297 |
| 5,204,980 | 4/1993 | Sharples | 455/135 |
| 5,263,184 | 11/1993 | Nakamura et al. | 455/226.2 |
| 5,355,526 | 10/1994 | Berninger | 455/161.2 |
| 5,432,854 | 7/1995 | Honjo et al. | 381/10 |

FOREIGN PATENT DOCUMENTS

| | | |
|---|---|---|
| 0 320 883 A2 | 6/1989 | European Pat. Off. |
| 0 418 036 A2 | 3/1991 | European Pat. Off. |

*Primary Examiner*—Forester W. Isen
*Assistant Examiner*—Xu Mei
*Attorney, Agent, or Firm*—Frishauf, Holtz, Goodman, Langer & Chick, P.C.

[57] ABSTRACT

In a circuit for deriving at least one quality signal that is dependent on the quality of a received signal, where the received signal is demodulated, a first auxiliary signal which is dependent on the field strength, and a second or further auxiliary signal, are derived from the demodulated signal. The auxiliary signal and the second or further auxiliary signal are combined to derive the quality signal.

14 Claims, 9 Drawing Sheets

RADIO RECEIVER CIRCUIT FOR DERIVING AT LEAST ONE RECEPTION QUALITY SIGNAL

Cross-reference to related patent applications, assigned to the assignee of the present invention, the disclosures of which are hereby incorporated by reference:

U.S. Ser. No. 08/192,505, VOGT et al., filed 3 Feb. 1994 now U.S. Pat. No. 5,442,709, Aug. 15, 1995; U.S. Ser. No. 08/218,651, HERRMANN, filed Mar. 28, 1994.

FIELD OF THE INVENTION

The invention relates generally to a radio receiver circuit for deriving at least one quality signal which is dependent on the quality of a received signal.

BACKGROUND

Especially in car or truck radios, the reception quality can vary significantly, for instance through dropouts in the received field strength, through multipath reception, or through reception of interfering signals. To keep disturbances caused in this manner to a minimum, various measures are known to mask these disturbances in the Audio Frequency (AF) signal. For instance, when the reception is bad, it is possible to attenuate the AF signal temporarily or to reduce stereo channel separation. However, these conventional steps are based on the assumption that signal quality can be determined precisely.

THE INVENTION

It is an object of the invention to provide a circuit for deriving at least one quality signal which is dependent on the quality of the received signal.

Briefly an auxiliary signal that is dependent on the field strength and another auxiliary signal are derived from the demodulated received signal; and the auxiliary signal and the other auxiliary signal are combined to establish the quality signal.

In accordance with an advantageous embodiment of the circuit of the invention the other auxiliary signal is made dependent on the amplitude of the portions of the demodulated signal that are above a useful frequency range. Preferably, for a stereo multiplex signal with a radio data signal, the upper frequency portions lie above 60 kHz.

This embodiment has the advantage that it reacts quickly and sensitively to disturbances. In addition, application of this embodiment is also possible for the reception of signals that do not contain a modulated subcarrier, particularly not a stereo difference signal at the frequency of a subcarrier.

According to another advantageous embodiment of the circuit of the invention, consists of the dependence of the additional auxiliary signal is made dependent on the symmetry of the sidebands of a modulated subcarrier contained in the demodulated signal. In this manner, disturbances are recognized only when they actually cause a degradation of the AF signal. An advantageous application of this embodiment provides that the modulated subcarrier is a stereo difference signal at the frequency of the subcarrier.

The additional auxiliary signal that is dependent on the symmetry of the sidebands, suitable for various known stereo decoders, is derived this way: A multiplied signal is generated by multiplication of a stereo difference signal at the frequency of the subcarrier with a reference carrier which is phase-shifted by 90°. The resulting, multiplied signal is then compared with a threshold value.

U.S. Ser. No. 08/192,505, filed Feb. 3, 1994, Vogt, Käser and Chahabadi, discloses a stereo decoder in which a reference carrier is not locked to the subcarrier of the received radio data signal. The other, or additional auxiliary signal, dependent on the symmetry of the sidebands, is preferably derived this way: Two signals are generated by multiplying the stereo difference signal at the frequency of the subcarrier by two reference carriers with a phase angle of 90° between each other. The multiplied signals are then multiplied with correction signals derived from the phase shift between the auxiliary carrier and the respective reference carrier. The so again multiplied signals are added, and the sum signal is compared with the threshold value.

The demodulated signal can be a stereo multiplex signal with a radio data signal (RDS). In this case, a first signal is derived from the portions of the stereo multiplex signal that are above 60 kHz and a second signal by comparing the sidebands of the stereo difference signal; the first and the second signal each pass through a logic circuit and a pulse width discriminator to form the additional auxiliary signal.

The advantage of this embodiment is that recognition of the reception quality is possible for both stereo and mono reception. This circuit design can be used even in countries with a different stereo system. In such cases, only the evaluation of the frequencies above the useful range is carried out for deriving the additional, or other auxiliary signal.

The circuit of the invention enables performance of various AF signal maskings dependent on the type of disturbance to the quality of the received signal. According to a feature of the invention, a temporary additional attenuation of the AF signal can be set. The amplitude demodulated reception signal is supplied to two low-pass filters with different limit frequencies. The outputs of the low-pass filters are connected with inputs of a changeover switch which is controlled by the other or additional auxiliary signal. It is especially advantageous, to also weigh the output signal of the changeover switch and multiply the signal by the additional auxiliary signal after it has passed through an asymmetric integrator, to create a quality signal that is used for attenuation of the AF signal generated from the demodulated signal, during any disturbance.

Another feature of the invention provides for weighing of the auxiliary signal being weighted and multiplying it by the additional auxiliary signal that has passed through an asymmetric integrator to create a quality signal which is used to reduce stereo channel separation during any disturbance.

DRAWINGS

Further features of the preferred embodiment will be apparent from the drawings, of which.

Similar or identical components are labeled with the same reference numerals in each drawing. The circuit of the invention can be implemented in several ways. For instance, individual blocks or groups of blocks shown can be implemented through suitable circuits, in particular through integrated circuits. At a high level of integration, it is additionally possible to implement the entire digital signal processing of the receiver in one integrated circuit. Signal processing steps like filtering or non-linear weighting can then be performed through arithmetic calculations. To physically implement a receiver, digital signal processors and other digital circuits like shift registers, flip-flops, etc., can be grouped with the circuit of the invention, within such an integrated circuit.

DETAILED DESCRIPTION

Figure 1:
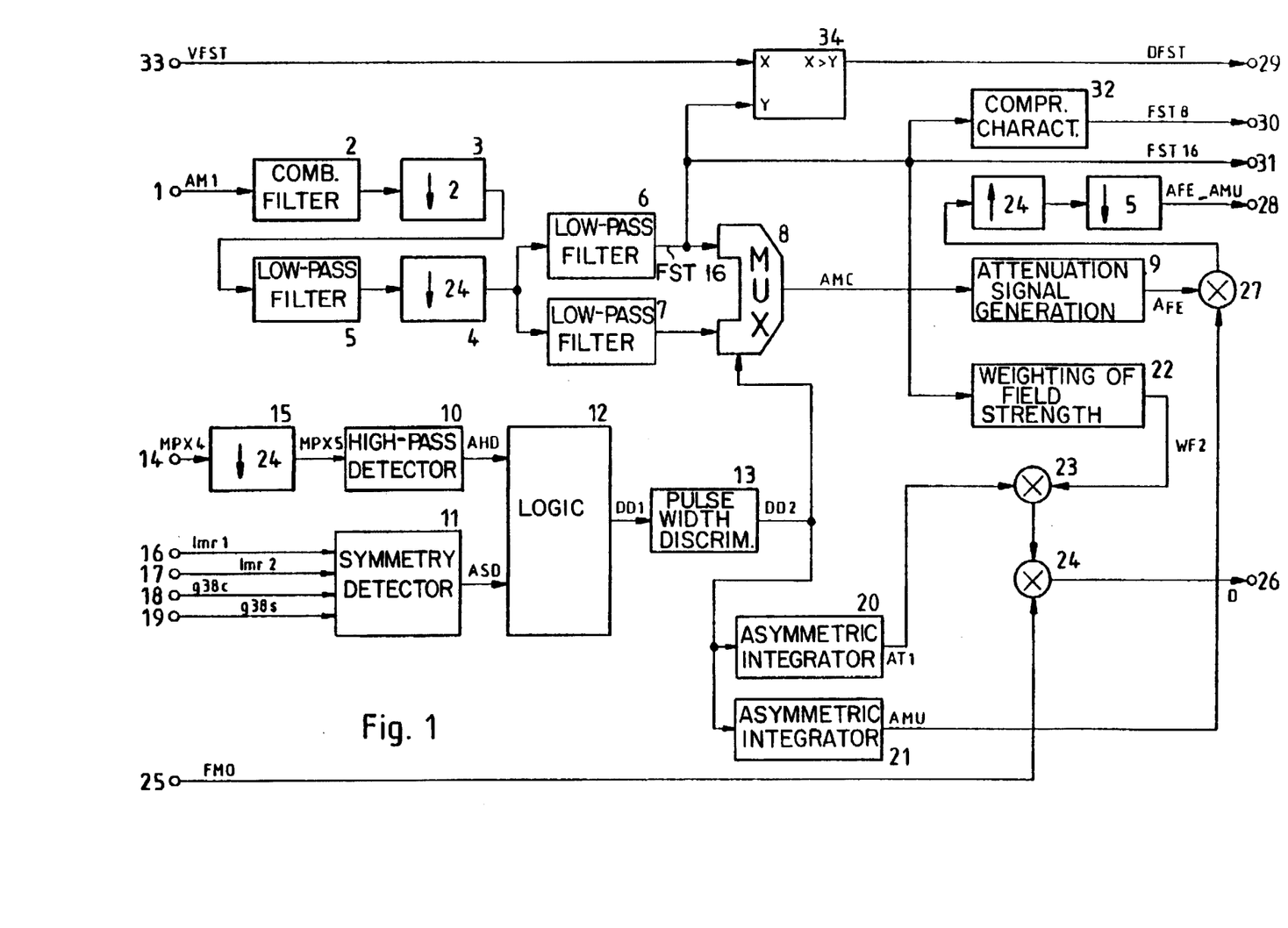
FIG. 1 is a block diagram of the system of the present invention.

The circuit according to FIG. 1 is supplied at terminal 1 with the output signal AM1 of an amplitude modulator (not shown). This signal serves as a gauge for the field strength. Signal AM1 with a sampling frequency of 456 kHz is first subjected to comb filtering in a filter 2. This prevents superposition of higher-frequency spectral components on the DC component and distortion of this DC component in an inadmissible manner at the subsequent under-sampling, by a factor 2 at sampling element 3, and later by a factor 24 at sampling element 4. An additional low-pass filter 5 is provided between the sampling elements 3 and 4.

A mean value of the field strength signal, thus decimated with regard to its sampling rate, is average by two low-pass filter elements 6, 7 with different time constants. Dependent on a signal DD2, a changeover switch 8 passes on one of the output signals of the low-pass filters 6, 7, as signal AMC. This signal is weighted in attenuation signal generation unit 9 in the form of a noise-up curve for creating noise-up attenuation $A_{FE}$. In addition, the field strength signal of the lower time constant, that is the "fast" field strength signal FST16 at the output of low-pass filter 6, serves to reduce stereo channel separation D when the field strength drops off. Further processing of signals $A_{FE}$ and FST16 will be explained below.

High-pass detector 10, a symmetry detector 11 and a logic network 12, whose output signal DD1 passes through a pulse width discriminator 13, serve to create the additional auxiliary signal DD2. To the high-pass detector, via a terminal 14 and a sampling rate reduction stage 15, there is fed a signal MPX5. The high-pass detector is described in detail with reference to FIG. 4. This signal MPX5 contains those portions of the stereo multiplex signal that are above 60 kHz, which have however already been transformed into the baseband. Such a circuit is described in greater detail in FIG. 3.

Output signal AHD of the high-pass detector 10 assumes the value 1 when the amplitude of the signal portions that are above 60 kHz are above the threshold value. This has the fundamental advantage that it reacts very promptly to all sorts of disturbances, that is, even to such interferences that are not multiple or multipath reception interferences. However, in extreme cases it can lead to the reporting of an interference that does not yet lead to audible distortions in the LF output signals of the receiver. Still, the steps planned for masking disturbances would be initiated in such a case.

An improvement of the invention that focuses on recognizing audible disturbances consists of evaluating the symmetry of the stereo difference signal at the carrier frequency.

Important in this approach is, on one hand, that a signal without disturbance must be symmetric to the carrier because of the double-sideband amplitude modulation, and on the other hand, that the wanted signal is directly observed. Asymmetry therefore allows the conclusion that a disturbance is present that is audible in the Audio Frequency (AF) signal as well. Via inputs 16 through 19, the symmetry detector 11 is supplied by a stereo decoder (FIG. 2) with signals, which basically represent the product of the stereo difference signal at the carrier frequency and the reference carrier. The latter is locked in quadrature to the subcarrier. Details of the symmetry detector are described below, in connection with FIG. 5. The output signal ASD of the symmetry detector assumes logic level 1 when asymmetry is present.

In many applications, the use of either signal AHD or ASD as additional auxiliary signal DD2 already offers significant advantages. In the embodiment shown, however, both detectors 10, 11 are provided and the output signals AHD and ASD pass through a logic network 12. This offers, on one hand, the advantage that deriving the additional auxiliary signal DD2 occurs through high-pass detector 10 for pure monaural programs where no stereo difference signal is broadcast. In addition, deriving the additional auxiliary signal DD2 is also possible for systems for stereo signal broadcasting that differ from the European Standard, for instance for the FMX system used in the U.S.A.

Figure 6:
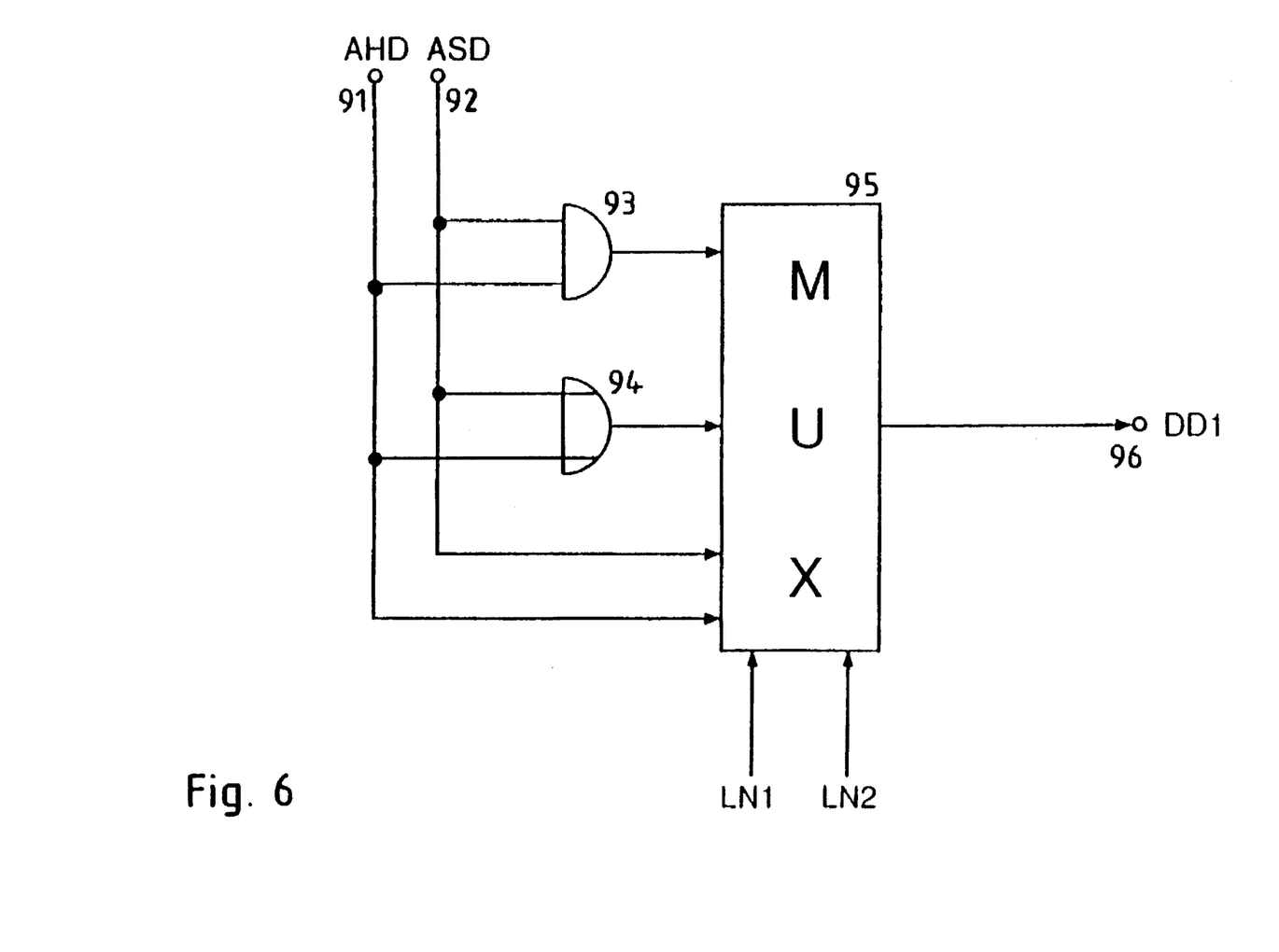
FIG. 6 is a logic network.
Figure 8:
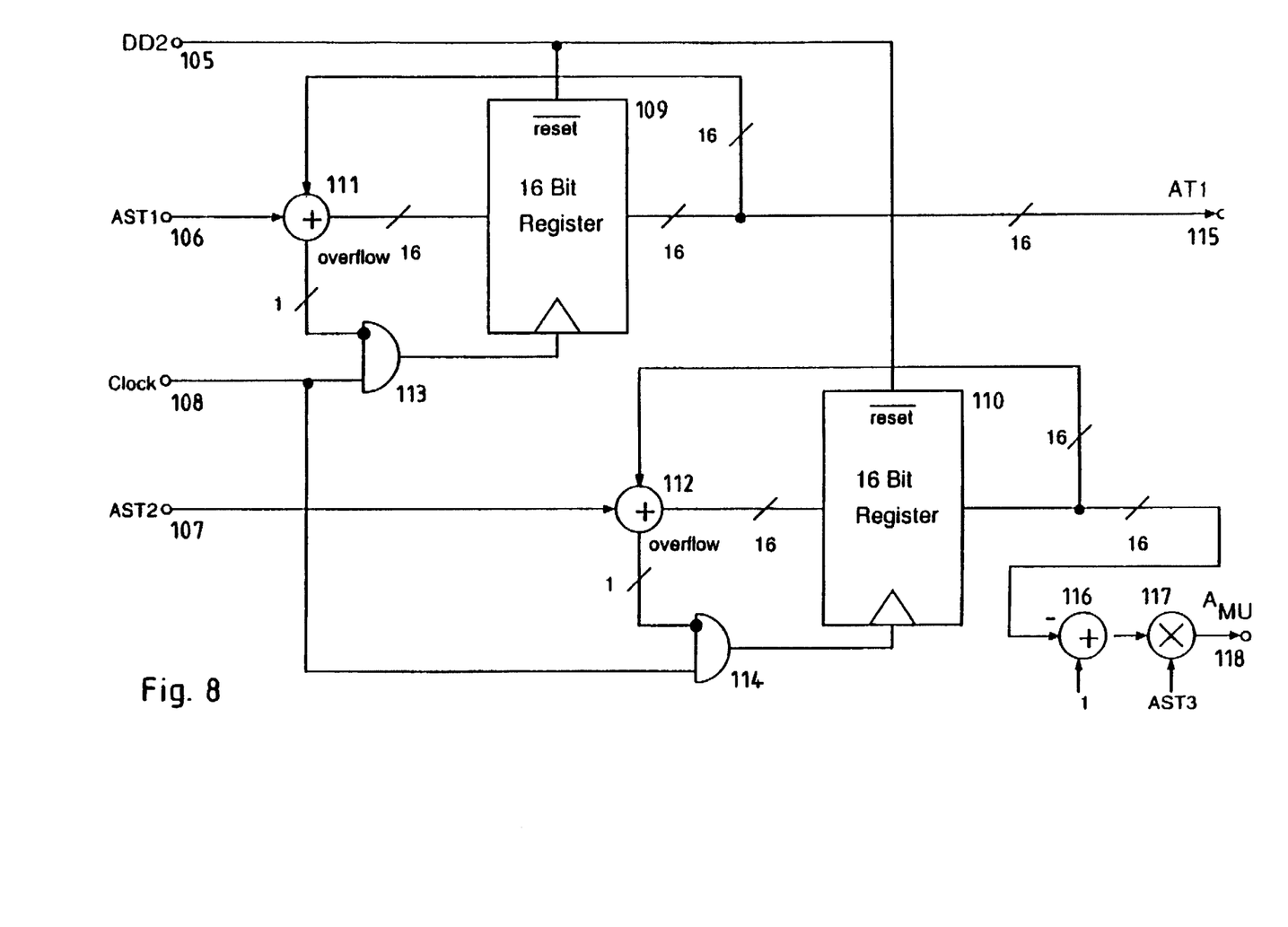
FIG. 8 is an asymmetric integrator for the additional auxiliary signal.

The logic network enables selection or type of logic linking of the two signals AHD and ASD with signal DD1. An exemplary embodiment of the logic network 12 is shown in FIG. 6. Signal DD1 passes through a pulse width discriminator 13, which insures that output signal DD2 reports a disturbance only when the input signal DD1 is active for an adjustable minimum duration. As mentioned above, when creating the field strength signal, signal DD2 toggles between a long and a short time constant. In addition, signal DD2 serves as trigger signal for two asymmetric integrators 20, 21, an exemplary embodiment of which is shown in FIG. 8.

At the triggering instant, output signals AT1 and AMU of the asymmetric integrators 20, 21 make a transition to 0, and 0.707 respectively, and remain at these levels as long as DD2 is at zero, to rise linearly to a maximum value over the adjustable time constant. Signal AT1 is supplied to a multiplier 23, together with the field strength signal WF2 that was weighted at 22. This forms a signal that causes masking of disturbances in the AF signal by reducing stereo channel separation. In another multiplier 24, this signal is multiplied by a signal FMO that has been supplied at 25, which provides compulsory cancellation of stereo channel separation. Signal D can be received at output 26 and supplied to the stereo decoder.

Output signal AMU of asymmetric integrator 21 is supplied to another multiplier 27 together with signal $A_{FE}$, which creates a signal AFE_AMU, that causes attenuation of the AF signal by a maximum of 33 dB (3 dB muting +30 dB noise-up attenuation). This AF signal can be picked up at output 28.

In a digital radio receiver, information concerning the field strength are needed at various locations. For this purpose, the circuit according to FIG. 1 features three additional outputs 29, 30, 31, where signals representing the field strength are available. Signal FST16, already mentioned previously, is accurate with 16 bits. For some purposes, however, a signal of lesser accuracy is sufficient. For this purpose, a field strength signal FST8 8 bits wide is created using a compression characteristic 32.

Though signals FST16 and FST8 are sufficiently fast for signal quality recognition, they do however exhibit a certain slowness, due to the filters described in connection with FIG. 1 and possibly due to amplitude demodulation. A signal VFST can be supplied from a conventional microcontroller (not shown) via input 33. From this signal and signal FST16, a signal DFST is created using a comparator 34. The logic level (0 or 1) of signal DFST depends on whether signal VFST or signal FST16 is larger. Because of this, signal DFST available at output 29 indicates the direction of change of the field strength.

Figure 2:
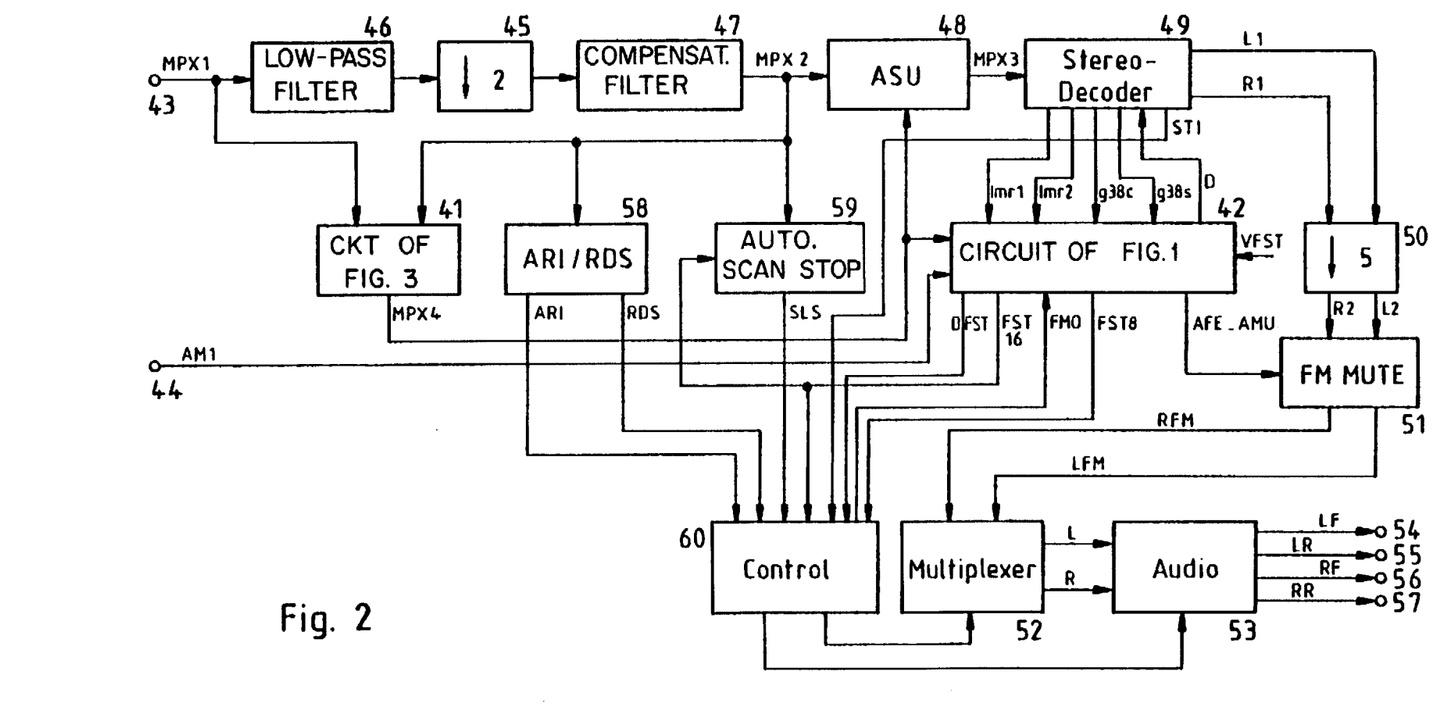
FIG. 2 is a block diagram of a portion of a radio receiver with the circuit of the invention.

Before greater details of the circuit design according to FIG. 1 are described, with the aid of FIGS. 3 through 9, implementation of a circuit of the invention, in a radio receiver is described using FIG. 2, where FIG. 2 depicts digital processing of the stereo multiplex signal and of the audio signals.

Circuit blocks 41, 42 form a circuit of the invention, where circuit block 42 contains the details shown in FIG. 1. A digital stereo multiplex signal MPX1 from an FM demodulator is supplied at an input 43, while the signal AM1 from an AM modulator is supplied at input 44. Initially, the stereo multiplex signal MPX1 undergoes a division of the sampling rate by half, resulting in the creation of signal MPX2. In an actually implemented exemplary embodiment, the sampling rate of signal MPX1 is 456 kHz, which is an integer multiple (i.e. 8) of the carrier frequency of the radio data signal (57 kHz).

However, such a high sampling frequency requires a large number of calculations per second. In the radio receiver shown, the intention is therefore to operate with the lowest possible sampling frequencies, which are compatible with the bandwidth of the respective signal. For this reason, signal MPX1 undergoes a division of the sampling frequency by half at 45, which necessitates prior low-pass filtering 46. However, since the essentially necessary low-pass filter with a linear frequency response over the entire portion of the passband and a steep decline in the area of the half sampling frequency that has already been divided in half, is very excessive, a low-pass filter 46 was used, which exhibits a gradual decline. To compensate for the resulting error, a compensation filter 47 with opposite frequency response is used.

Signal MPX2 with a sampling rate of 228 kHz is supplied to a circuit 48 for automatic noise suppression. Such circuits suppress brief pulse-shaped noise signals and have become known by the abbreviation ASU. Output signal MPX3 of circuit 48 is supplied to a stereo decoder 49, where the two audio signals L1 and R1 (left and right) are created, which undergo a transformation of the sampling rate by a factor 5 in 50. The resultant audio signals L2, R2 as signals LFM and RFM are supplied to inputs of a source switch or multiplexer 52 via a circuit 51 with controllable attenuation. In an otherwise not shown manner, the source switch or multiplexer 52 is supplied with other audio signals, for instance from a CD player or a tape deck.

The output signals of the multiplexer 52, namely signals L and R, are supplied to an audio processor 53, which is used to perform adjustments like volume control, balance adjustment, and treble or bass cut or boost. The audio processor 53 has four outputs 54, 55, 56, 57 which supply the signals LF, LR, RF, and RR to an output amplifier (not shown) for four loudspeakers (e.g. Left Front, Left Rear, Right Front and Right Rear speakers).

In addition, the stereo multiplex signal MPX2 is supplied to a decoder 58 for traffic broadcast signals and/or radio data signals. ARI is a registered trademark * of Blaupunkt Werke for traffic broadcasting, while RDS is an acronym for the Radio Data System promulgated by the European Broadcasting Union. Signal MPX2 is further used in a circuit 59 to stop automatic station seeking/scanning.

*U.S. Reg. 1,282,281

A control unit 60 receives signals from circuits 58, 59, and 42, as well as from stereo decoder 49. It supplies signals to circuit 42, source switch 52 and audio processor 53. Other connections of the control unit 60, for instance with control and display elements are not shown in FIG. 2. Control unit 60 can be of any suitable conventional structure.

Figure 3:
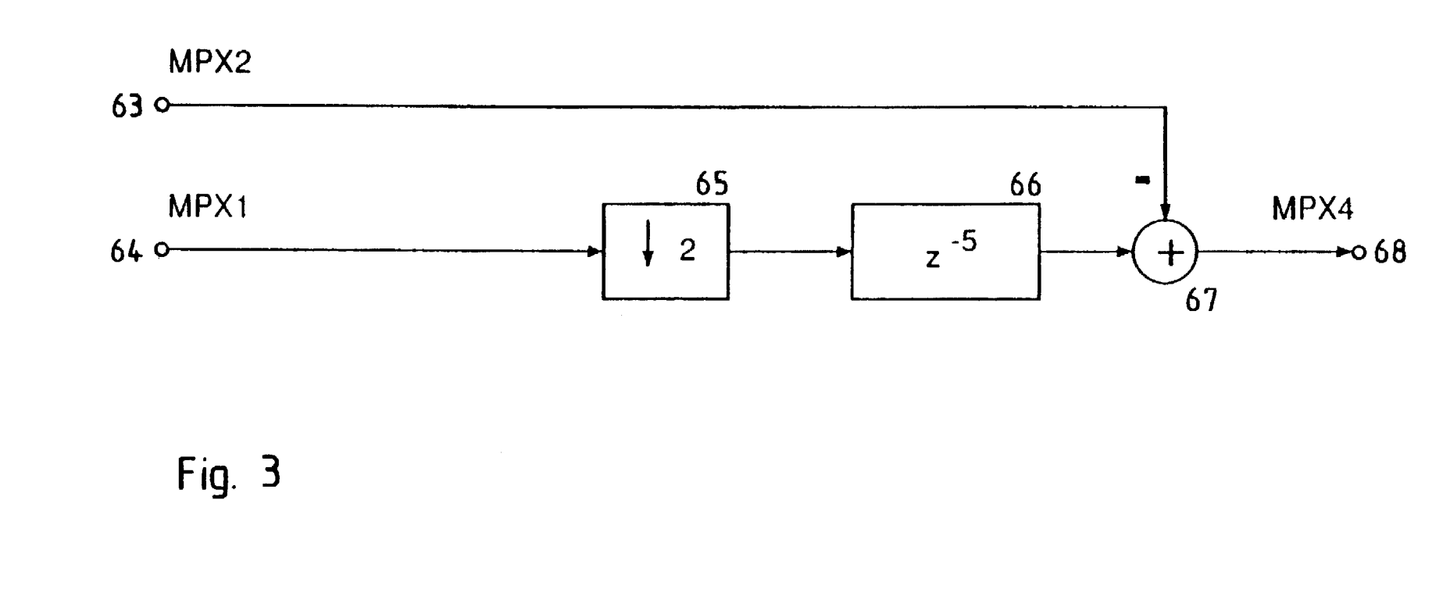
FIG. 3 is a high-pass filter as part of a circuit of the invention.

As has already been described in connection with FIG. 1, a signal that consists of the portions of the stereo multiplex signal that are above 60 kHz is needed for the high-pass detector 10. This signal is generated in circuit 41 which is supplied with signals MPX1 and MPX2. An exemplary embodiment of circuit 41 is shown in FIG. 3. Inputs 63, 64 of this circuit are intended for signals MPX2 and MPX1. Through undersampling of signal MPX1 at 65 and after running time compensation with 5 pulse periods at 66, signal MPX2 is subtracted from this signal at 67. Signal MPX4 at output 68 basically contains only the remaining spectral portions from above 60 kHz, shifted into the baseband.

Figure 4:
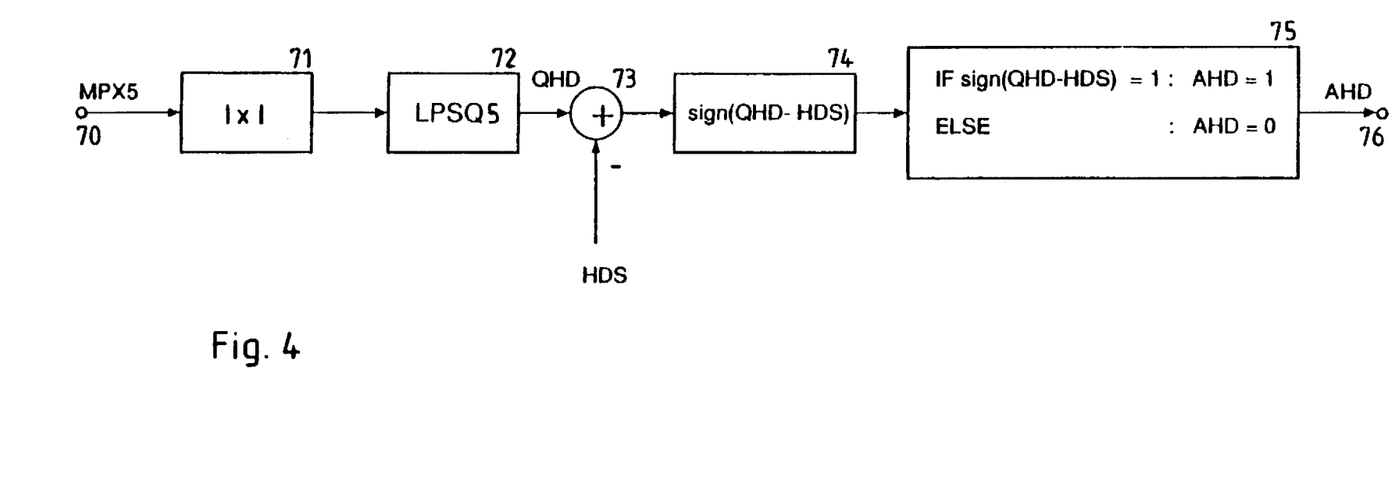
FIG. 4 is a detector diagram for evaluating the output signals of the high-pass filter.

This signal, after sampling rate reduction by a factor 24 at 15 (FIG. 1) is supplied as signal MPX5 to the high-pass detector 10 that will be described in greater detail below, with reference to FIG. 4. Signal MPX5 is supplied to an input 70 of the high-pass detector according to FIG. 4. After summation 71, the mean value of the signal is formed at low-pass filter 72. If the mean of the signal exceeds a threshold HDS, the output signal of a comparator, consisting of subtractor 73 and sign recognition 74, assumes logic state 1. Signal AHD at output 76 assumes logic state 1 as well, if the sign of the output signal of subtractor 73 is positive.

Figure 5:
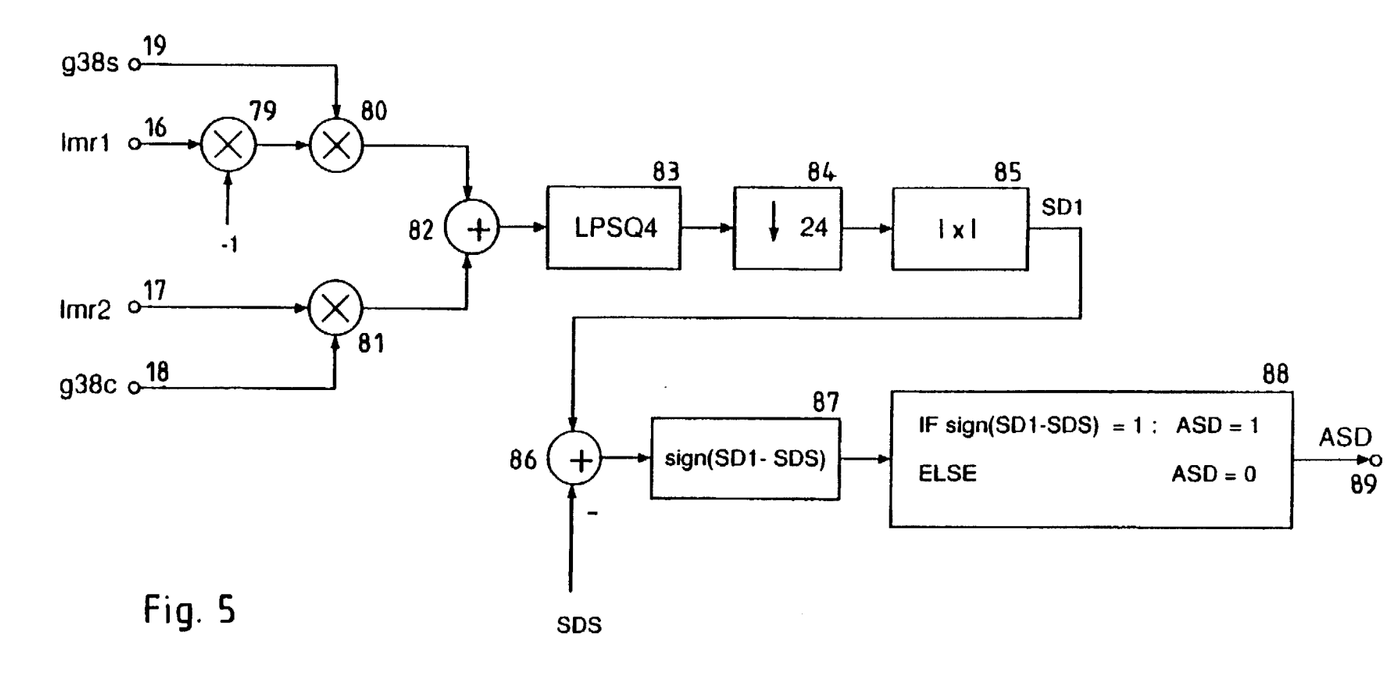
FIG. 5 is a symmetry detector for the sidebands of the stereo difference signal at the frequency of the subcarrier.

FIG. 5 shows an exemplary embodiment of symmetry detector 11 (FIG. 1), whose sole function is to ensure that no output signal is created when multiplying the stereo multiplex signal by a reference carrier, which is locked in quadrature to the carrier of the stereo difference signal, and if the sidebands have amplitudes of equal height. Such a signal is created anyway in stereo decoders with quadrature demodulation for the stereo difference signal at carrier frequency, where a multiplication is carried out by two reference carriers with a 90° phase angle to each other, and where the phase position is determined by a PLL circuit. See our aforementioned U.S. Ser. No. 08/192,505, VOGT et al., now U.S. Pat. No. 5,442,709, Aug. 15, 1995.

When using such stereo decoders, the signal generated by demodulation of the quadrature components can be supplied directly to a low-pass filter 83, that is followed by sampling rate change 84 by a factor 24. Thereafter, summation occurs at 85, and the generated signal SD1 is then compared to a threshold value SDS at 86 and 87. At 88, the result of this comparison is evaluated, such that signal ASD at output 89 will assume logic state 1, if the signal SD1 is greater than the threshold value SDS.

For stereo decoders, where the stereo difference signal at auxiliary carrier frequency is multiplied by two reference carriers with a phase angle of 90° to each other and whose phase position in relation to the carrier is not determined, the following signal processing described below needs to be performed before low-pass filtering at 83. Inputs 16 and 17 are supplied with signals lmr1 and lmr2 which are the result of multiplication with the two reference carriers that have a 90° phase angle to one another. Inputs 18 and 19 are supplied with the respective correction signal G38c or G38s, which describes the error created because of the missing coupling. With these correction signals, signals lmr1, which was previously multiplied by −1 at 79, and lmr2 are multiplied at 80 and 81. The output signals of multipliers 80, 81 are added at 82 and supplied to the low pass filter 83.

The logic network according to FIG. 6 enables selective logic linking of the two signals AHD and ASD of the high-pass detector 10 (FIG. 1) and the symmetry detector 11. For this purpose, the two signals from inputs 91, 92 are supplied to a selector switch 95 with four inputs, either via an AND-gate 93, an OR-gate 94, or directly. Using the supplied control signals LN1 and LN2, either the output of the AND-gate 93, the output of the OR-gate 94, or one of the inputs 91, 92 can be connected to output 96. If output 96 is connected to the output of the AND-gate 93, output signal DD1 will assume logic state 1 only when both input signals AHD and ASD are at logic 1. That means, a disturbance is only indicated, when both the high-pass detector 10 and the symmetry detector 11 recognize a disturbance.

If output 96 is connected to the output of the OR-gate 94, a disturbance is already reported when one of the detectors recognizes a disturbance. Finally, when output 96 is connected to 91, or input 92 respectively, a disturbance is only reported when the high-pass detector 10 or the symmetry detector 11 respectively, recognizes a disturbance. Control signals LN1, LN2 can be preset and, if necessary, adjusted, according to the respective operating conditions of the radio receiver.

Figure 7:
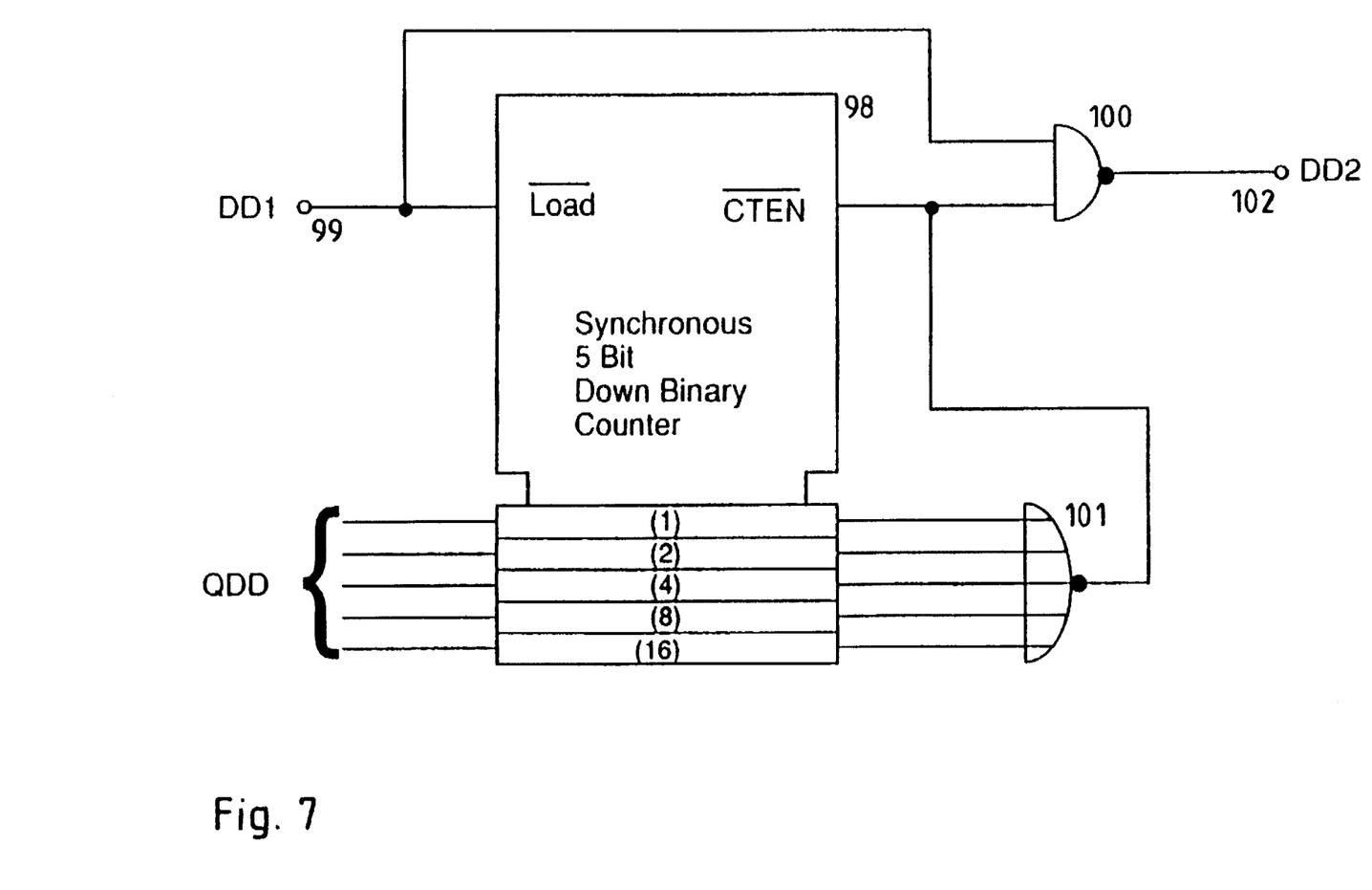
FIG. 7 is a circuit for filtering the additional auxiliary signal.

FIG. 7 shows an exemplary embodiment of the pulse width discriminator 13 (FIG. 1). The critical component of this circuit is a synchronous 5-bit binary downcounter 98, whose inverting load input is supplied with signal DD1 from the logic network 12 (FIG. 1) via an input 99. Inputs of NAND-gate 100 are connected to input 99, to the output of a NOR-gate 101 and to an inverting count-enable input of counter 98. PRESET inputs of counter 98 can be supplied with a constant QDD, which represents a selectable delay time.

As long as signal DD1 is at logic 0 (no disturbance), the counter 98 is halted at the counter position QDD. With that, the level of the output of the NOR-gate 101 is at logic 0 causing the level of signal DD2 at output 102 to be at logic 1. For signal DD2, a logic 1 level indicates that no disturbance is present. Through a logic transition of signal DD1 to logic 1, counter 98 starts to count down. The logic level of signal DD2 however changes only if signal DD1 remains at logic 1 at least for the preset delay time. Then the counter reaches the 0-position, causing an output signal transition to 1 of the NOR-gate 101, causing the counter to remain in the 0-position and signal DD2 to make a transition to logic 0. If signal DD1 returns to logic 0, the counter is re-loaded, while signal DD2 resumes the logic 1 level without delay. The delay time is the product of QDD times the pulse period for the counter.

An exemplary embodiment of the asymmetric integrators 20, 21 (FIG. 1) is shown in FIG. 8. Signal DD2, two constants AST1 and AST2, and a clock signal can be supplied via inputs 105 through 108. For each respective asymmetric integrator 20, 21, a 16-bit register 109, 110, an adder 111, 112, and an AND-gate 113, 114 are provided. At output 115 of register 109, signal AT1 can be received, while the output of register 110 is connected to an output 118 for signal AMU via a subtractor 116 and a multiplier 117.

As long as signal DD2 is at logic 0 (existing interference), the register outputs are at logic 0 as well. Then, AT1=0 and AMU=AST3, which is another supplied constant. When signal DD2 makes a transition to logic 1 (end of disturbance) and remains at this level, the output values of the registers begin to rise linearly over time in relation to the constants AST1 and AST2. Once they reach their respective maxima, which is recognized through polling the overflow of adders 111, 112, they will remain at these maximum levels until, during another disturbance, signal DD2 makes another transition to logic 0, resetting the registers immediately.

Figure 9:
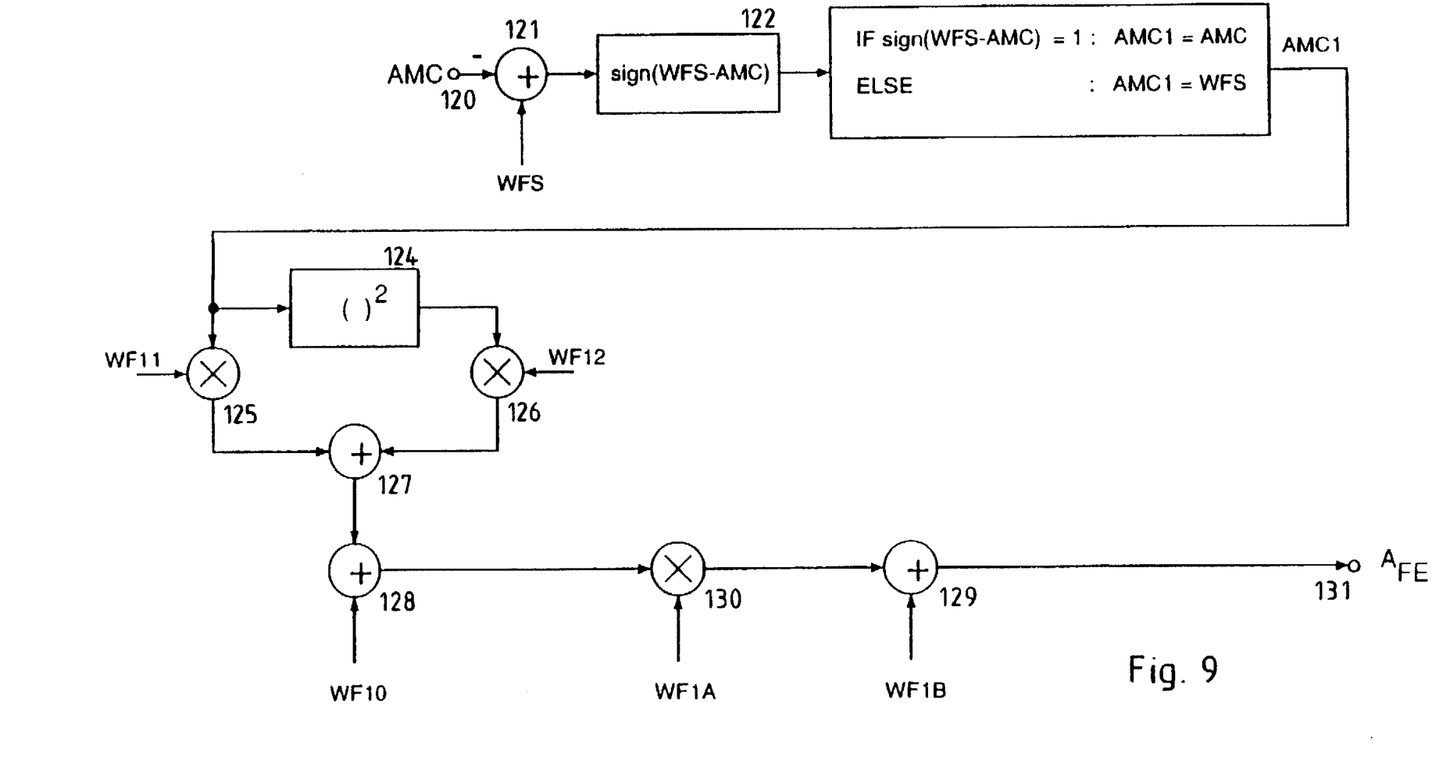
FIG. 9 is a circuit designed for weighting the auxiliary signal.

FIG. 9 shows an exemplary embodiment of circuit 9 for weighting the signal AMC, which can be supplied to an input 120. Using a subtractor 121, a sign recognition 122, and an evaluation 123, a signal AMC1 is created, which corresponds to the signal AMC until a threshold value WFS is reached. If AMC continues to increase, AMC1 will remain at the WFS value. This signal is squared at 124.

Signal AMC1 and the squared signal are each multiplied by coefficients WF11 and WF12 at 125, 126, thus generating a signal through addition at 127, which is locked in quadrature to signal AMC in the range of 0 to WFS. An additional adder 128, 129, and an additional multiplier 130 enable addition of constants WF10 and WF1B and multiplication by a factor WF1A. Then, signal $A_{FE}$ can be received at output 131. Circuit design 22 for weighting signal FST16 can be designed in similar manner.

Various changes and modifications are possible within the scope of the inventive concept.

We claim:

1. A radio receiver circuit for obtaining at least one quality signal which is dependent on the quality of a received signal, in which receiver circuit the received signal is demodulated and provides a demodulated signal, comprising
    means for deriving a first auxiliary signal (FTS16), which is dependent on the field strength of the received signal;
    means for deriving a second auxiliary signal from the demodulated signal, and
    means for combining the first and second auxiliary signals to generate the quality signal; and
    wherein the first auxiliary signal (FTS16), to generate a third auxiliary signal which is dependent on the field strength, is weighted according to a weighting curve whose slope is steeper for small values of the first auxiliary signal (FTS16) than for larger values.

2. Circuit according to claim 1, wherein the second auxiliary signal is dependent on the amplitude of portions of the demodulated signal which are above an audio reproduction frequency range.

3. Circuit according to claim 2, wherein, said received signal is a stereo multiplex signal with a radio data signal, and the higher frequency portions above audio reproduction frequency are above 60 kHz.

4. Circuit according to claim 1, wherein the weighting curve is defined by a polynomial of the first order, whose coefficient can be adjusted in increments.

5. Circuit according to claim 1, wherein for the formation of a signal (DFST), representing change in field strength, the first auxiliary signal (FST16) is compared to a field strength signal (VFST) which is supplied to the circuit.

6. A radio receiver circuit for obtaining at least one quality signal which is dependent on the quality of a received signal, in which receiver circuit the received signal is demodulated and provides a demodulated signal which includes a modulated subcarrier, comprising
    means for deriving a first auxiliary signal, which is dependent on the field strength of the received signal;
    means for deriving a second auxiliary signal from the demodulated signal,
    said second auxiliary signal being dependent on the symmetry of the sidebands of the modulated subcarrier contained in the demodulated signal; and means for combining the first and second auxiliary signals to generate the quality signal.

7. Circuit according to claim 6, wherein
the modulated subcarrier is a stereo difference signal at subcarrier frequency.

8. Circuit according to claim 7, wherein the stereo difference signal at subcarrier frequency is demodulated by multiplication by a reference carrier decoupled with respect to the subcarrier,
wherein said means for deriving the additional auxiliary signal, which is dependent on the symmetry of the sidebands, comprises
first means for multiplying the stereo difference signal at the frequency of the subcarrier by two reference carriers with a phase angle of 90° relative to each other, and deriving multiplied signals;
second means for multiplying the multiplied signals by one correction signal each, derived from the phase shifting between the subcarrier and the respective reference carrier;
adding means for adding the twice multiplied signals and obtaining a summed signal; and
means for comparing the summed signal to a threshold value.

9. A radio receiver circuit for obtaining at least one quality signal which is dependent on the quality of a received signal,
in which receiver circuit the received signal is demodulated and provides a demodulated signal, comprising
means for deriving a first auxiliary signal, which is dependent on the field strength of the received signal;
means for deriving a second auxiliary signal from the demodulated signal,
wherein the demodulated signal is a stereo difference signal at a subcarrier frequency and said stereo difference signal is demodulated by multiplication by a reference carrier coupled with the subcarrier,
wherein said means, for deriving the second auxiliary signal, which is dependent on the symmetry of the sidebands, includes means for multiplying a stereo difference signal at the frequency of the subcarrier by a reference carrier with a phase shift of 90° to obtain a multiplied signal;
means for comparing the multiplied signal to a threshold value; and
means for combining the first and second auxiliary signals to generate the quality signal.

10. Circuit according to claim 9, wherein summation is carried out by squaring.

11. A radio receiver circuit for obtaining at least one quality signal which is dependent on the quality of a received signal,
in which receiver circuit the received signal is demodulated and provides a demodulated signal, comprising
means for deriving a first auxiliary signal, which is dependent on the field strength of the received signal;
means for deriving a second auxiliary signal from the demodulated signal,
wherein the demodulated signal is a stereo multiplex signal including a radio data signal, wherein said first auxiliary signal is derived from the portions of the stereo multiplex signal that are above 60 kHz and the second auxiliary signal by comparing the sidebands of the stereo difference signal, and
wherein the first and the second auxiliary signals pass through a logic circuit (12) and a pulse width discriminator (13); and
means for combining the first and second auxiliary signals to generate the quality signal.

12. A radio receiver circuit for obtaining at least one quality signal which is dependent on the quality of a received signal,
in which receiver circuit the received signal is demodulated and provides a demodulated signal, comprising
means for deriving a first auxiliary signal, which is dependent on the field strength of the received signal;
means for deriving a second auxiliary signal from the demodulated signal,
wherein the received signal is demodulated to derive the first auxiliary signal, and the amplitude demodulated received signal is supplied to two low-pass filters (6, 7) with different filter pass frequencies;
wherein the outputs of the low-pass filters are connected to inputs of a changeover switch (8) which is controlled by the second auxiliary signal; and
means for combining the first and second auxiliary signals to generate the quality signal.

13. Circuit according to claim 12, wherein, in addition, the output signal (AMC) of changeover switch (8) is weighted and multiplied by the second auxiliary signal;
and said combining means includes an asymmetric integrator (21) through which the output signal from the changeover switch (8) is passed, to generate a quality signal (AFE AMU), which is used for attenuation of an Audio Frequency (AF) signal, generated from the demodulated signal, during any disturbance.

14. A radio receiver circuit for obtaining at least one quality signal which is dependent on the quality of a received signal,
wherein said received signal is a stereo multiplex signal with a radio data signal and higher frequency portions above audio reproduction frequency are above 60 kHz,
in which receiver circuit the received signal is demodulated and provides a demodulated signal, comprising
means for deriving a first auxiliary signal, which is dependent on the field strength of the received signal;
means for deriving a second auxiliary signal from the demodulated signal,
wherein the second auxiliary signal is dependent on the amplitude of portions of the demodulated signal which are above an audio reproduction frequency range; and
wherein the first auxiliary signal (FST16) is weighted and multiplied by the second auxiliary signal, which has passed through the asymmetric integrator (20), to generate a quality signal (D), which is used to reduce stereo channel separation during any disturbance.

* * * * *